3,404,208
PESTICIDAL N-ACYL-N-LOWER ALKYL CARBAMATES OF PHENOLS AND NAPHTHOLS WITH DECREASED MAMMALIAN TOXICITY
William Alexander Hamilton Robertson, Londonderry, North Ireland, Patrick Geoffrey Clinch, Wellington, New Zealand, and James Fraser, Nottingham, England, assignors to Boots Pure Drug Company Limited, Nottingham, England
No Drawing. Continuation-in-part of applications Ser. No. 278,464, May 6, 1963, and Ser. No. 398,109, Sept. 21, 1964. This application Aug. 17, 1965, Ser. No. 480,499
Claims priority, application Great Britain, May 24, 1962, 20,033/62
19 Claims. (Cl. 424—300)

This invention relates to new chemical compounds, pesticidal compositions containing them as active ingredients and the use of said new compounds to control pests. It provides a new class of compounds, namely the N-acyl-N-lower alkylcarbamates of phenols and naphthols.

This application is a continuation-in-part of our earlier application S.N. 398,109 filed Sept. 21, 1964 and now application S.N. 278,464, filed May 6, 1963 and now also abandoned.

According to one feature of the invention there are provided compounds of the general Formula I

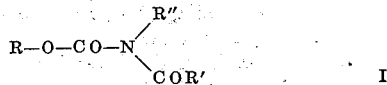

wherein R″ represents a lower alkyl radical; R′CO represents the acyl residue of an organic carboxylic acid; and R represents a naphthyl, phenyl or substituted phenyl radical.

Typical substituents in the radical R include one or more lower alkyl, lower alkoxy, lower cycloalkyloxy, lower cycloalkyl, lower cycloalkenyl, lower alkenyl, lower alkylthio, phenyl lower alkyl, phenyl lower alkoxy, phenyl lower alkylthio, di-lower alkylamino, nitro, hydroxy and phenyl radicals, halogen atoms, and the

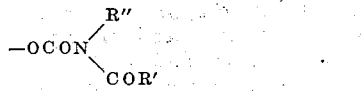

radical.

Typical values of R′ are the following: alkyl, alkenyl, halogenated alkyl, halogenated alkenyl, phenyl and substituted phenyl, alkoxyalkyl, alkoxyalkoxyalkyl, phenylalkoxyalkyl, alkylthioalkyl, alkylsulphinylalkyl, alkylsulphonylalkyl, nitrophenyalkyl, aminophenylalkyl, phenoxyalkyl, nuclearly substituted phenoxyalkyl, phenylthioalkyl, nuclearly substituted phenylthioalkyl, thiocyanatoalkyl, phenylsulphinylalkyl, nuclearly substituted phenylsulphinylalkyl, phenylsulphonylalkyl, nuclearly substituted phenylsulphonylalkyl, carboxyl (in the form of the free acid, salts or esters), carboxyalkyl (in the form of the free acid, salts or esters), sulphoalkyl (in the form of the free acid, salts or esters) radical, and a quaternary ammonium alkyl radical

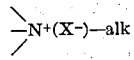

in which the individual valency bonds of the nitrogen are separately linked with alkyl, cycloalkyl, phenyl or phenylalkyl radicals or two or three of the valency bonds are joined by an alkylene or alkenylene chain to form a saturated or unsaturated heterocyclic ring with the nitrogen atom —alk— represents an alkylene radical, and X represents a conventional quaternising anion.

Representative of the components of the invention are those containing the radicals listed below; this list is illustrative only and is not intended to limit the invention.

R′CO (a) Alkanoyl containing 1–16 carbon atoms, unsaturated derivatives thereof and halogenated derivatives thereof e.g. acetyl, propionyl, butyryl, chloroacetyl, dichloroacetyl, formyl, hexanoyl, dodecanoyl, acryloyl, crotonyl.

(b) Benzoyl and substituted benzoyl containing for example alkyl, halogen, hydroxy or nitro groups in the phenyl nucleus.

(c) Alkoxyalkanoyl e.g. methoxyacetyl, methoxypropionyl, ethoxyacetyl, ethoxypropionyl, higher alkoxyalkanoyl radicals such as decyloxyacetyl.

(d) Alkoxyalkoxyalkanoyl e.g. ethoxyethoxyacetyl, butoxyethoxyacetyl, ethoxyethoxypropionyl, butoxyethoxypropionyl.

(e) Alkylthioalkanoyl e.g. methylthioacetyl, methylthiopropionyl, ethylthioacetyl, ethylthiopropionyl, decylthioacetyl.

(f) Alkylsulphinylalkanoyl e.g. methylsulphinylacetyl, ethylsulphinylacetyl, methylsulphinylpropionyl, ethylsulphinylpropionyl, decylsulphinylacetyl.

(g) Alkylsulphonylalkanoyl e.g. methylsulphonylacetyl, ethylsulphonylacetyl, methylsulphonylpropionyl, ethylsulphonylpropionyl, decylsulphonylacetyl.

(h) Phenoxyalkanoyl e.g. phenoxyacetyl, phenoxypropionyl.

(i) Substituted phenoxyalkanoyl e.g. tolyloxyacetyl, tolyloxypropionyl, methoxyphenoxyacetyl, methoxyphenoxypropionyl, halogenophenoxyacetyl particularly chlorophenoxyacetyl, halogenophenoxypropionyl particularly chlorophenoxypropionyl.

(j) Phenylthioalkanoyl e.g. phenylthioacetyl, phenylthiopropionyl and similar radicals contain substituents in the phenyl nucleus, such as methyl or methoxy radicals or halogen atoms.

(k) Thiocyanatoalkanoyl e.g. thiocyanatoacetyl, thiocyanatopropionyl.

(l) Phenylsulphinylalkanoyl; (m) Phenylsulphonylalkanoyl e.g. radicals similar to those exemplified in (g) above, in which the thio atom is replaced by the sulphinyl or sulphonyl group.

(n) Carboxyalkanoyl e.g. carboxypropionyl, carboxybutyryl, methoxycarbonylpropionyl, methoxycarbonybutyryl, similar radicals in which the alkoxy group is higher alkoxy and the acid is a higher alkanoic acid, and salts such as alkali metal, the ammonium and amine salts.

(o) Sulphoalkanoyl e.g. sulphoacetyl, sulphopropionyl, and salts e.g. alkali metal, the ammonium and amine salts, and esters e.g. methyl, ethyl, benzyl, phenyl esters.

(p) 

e.g. diethylaminoacetyl ethochloride, dimethylaminoacetyl methochloride, methylphenylaminoacetyl methochloride, benzylmethylaminoacetyl methochloride, N-piperidylacetyl ethochloride, N-pyridylacetyl chloride, and similar radicals derived from higher acids and/or containing other anions such as sulphate, p-toluenesulphonate, iodide.

R (a) Phenyl and diphenyl;
(b) Alkylphenyl, e.g. tolyl, ethylphenyl, n- and iso-propylphenyl, n-, sec-, iso- and t-butylphenyl;
(c) Alkoxyphenyl, e.g. methoxy-, ethoxy-, n- and iso-propoxy-, n-, sec-, iso- and t-butoxyphenyl;
(d) Cycloalkylphenyl, e.g. cyclopentyl- and cyclohexylphenyl;

(e) Cycloalkenylphenyl, e.g. cyclopentyl- and cyclohexenylphenyl;
(f) Alkenylphenyl, e.g. allylphenyl;
(g) Alkylthiophenyl, e.g. methylthio-, ethylthio-, n- and isopropylthio-, n-, sec-, iso- and t-butylthiophenyl;
(h) Dialkylaminophenyl, e.g. dimethylaminophenyl;
(i) Halogenophenyl, e.g. chloro- and bromophenyl;
(j) Naphthyl, e.g. 1- naphthyl.

The phenyl nuclei may contain one or more of the substituents exemplified above, and in the case of nuclei containing more than one substituent, these may be the same or different. Typical examples of R of this type are as follows: dimethylphenyl, diethylphenyl, dipropylphenyl, dibutylphenyl, methylisopropylphenyl, trimethylphenyl, dimethylamino-dimethylphenyl, (e.g. 4-dimethylamino - 3,5 - dimethylphenyl), dimethoxyphenyl, methyldinitrophenyl, chloro-methylphenyl, e.g. 2-chloro-4,5-dimethylphenyl, 4 - methylthio - 3,5 - dimethylphenyl and 3-sec.butyl-4-methyl-phenyl.

The compounds of the invention may be prepared by methods which are themselves known, and processes for preparing the compounds by these methods form additional features of the invention. Typical processes include:

(a) The acylation of a compound of the general Formula II

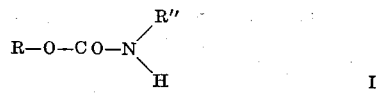
                                                                                        I wherein R and R'' are as hereinbefore defined, with an acylating agent capable of providing the R'CO— radical. Such agents include the anhydrides $(R'CO)_2O$, the acid halides R'COHal, and the corresponding esters and ketenes. When an acid halide, is used it is possible to employ the compound of general Formula II in the form of a metal salt, e.g. the sodium salt. When an acid anhydride is used, an improved yield of the desired product may be obtained in the presence of an acylation catalyst e.g. sulphuric acid, p-toluenesulphonic acid, boron trifluoride, perchloric acid, etc.

(b) The reaction of the appropriate hydroxy compound ROH or a salt thereof with a carbamoyl halide of the general Formula III

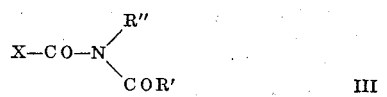
                                                                                        III wherein X represents a halogen atom and R'CO and R'' are as hereinbefore defined.

(c) The reaction of a haloformic ester ROCOX, wherein X represents a halogen atom with a compound of the general Formula IV

                                                                                        IV or a metal salt thereof, wherein R'CO and R'' are as hereinbefore defined.

(d) The reaction of a carbonic acid derivative of the general Formula V

                                                                                         V wherein $R^0$ represents a hydrocarbon radical, preferably lower alkyl, with a compound of the aforementioned general Formula IV or a metal salt thereof.

(e) The interchange of esters, whereby the appropriate hydroxy compound ROH is reacted with an ester of general Formula VI

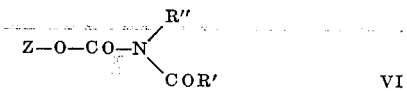
                                                                                        VI wherein Z is an ester-forming radical which may or may not fall within the definition of R.

(f) The alkylation of a compound of the general Formula VII

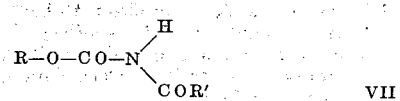
                                                                                       VII wherein R and R'CO are as hereinbefore defined, with a compound, e.g. an alkyl halide or dialkyl sulphate, capable of providing the R'' radical.

In some cases it is advantageous to employ processes involving the production of intermediate compounds containing an R'CO radical which is not the desired radical but is readily transformable into the desired radical. Examples of this type of reaction include the following:

(a) Reaction of an N-haloalkanoylcarbamate with potassium thiocyanate to give the corresponding N-thiocyanatoalkanoylcarbamate.

(b) Reaction of an N-haloalkanoylcarbamate with a trialkylamine to give the corresponding N-diakylaminoalkanoylcarbamate in the form of an N-alkyl quaternary salt.

(c) Reaction of an N-haloalkanoylcarbamate with a salt of a benzenesulphinic acid to give the corresponding N-benzenesulphonylalkanoylcarbamate.

(d) Oxidation of an N-alkylthioalkanoylcarbamate to give the corresponding N-alkylsulphinyl- and N-alkylsulphonylalkanoylcarbamates.

The compounds of the invention have been found to possess valuable pesticidal properties. In particular the new class of compound provided by the invention includes within it many extremely active insecticides, as well as compounds possessing acaricidal, molluscicidal, mematocidal and fungicidal properties. Thus for example, many of the compounds possess high activity against pests of the orders Lepidoptera e.g. *Pieris brassicae, Cydia pomonella, Plutella maculipennis, Adoxophyes orana, Prodenia litura* and *Pseudaletia* spp.; Coleoptera e.g. *Phaedon cochleariae, Leptinotarsa decemlineata, Melontha* supp. and *Anthonomus grandis;* Diptera e.g. *Lucilia sericata, Musca domestica, Stomoxys calcitrans,* Hypoderma spp. and Aedes spp.; Hemiptere e.g. *Megoura viciae, Aphis fabae, Dysdercus faciatus,* Aleurodidae spp. and Coccidae spp.; Orthoptera e.g. Blattidae spp., Acridiidae spp. and Tettigoniidae spp.; Hymenoptera, particularly the Symphyta sub-order; Thysanoptera; Acarina e.g. Tetranychus spp., Ixodes spp., Dermanyssus spp. and Boophilus spp.; Nematoda; Mollusca, Isoptera, Anoplura and Siphonaptera.

Some of the compounds of the invention exhibit systemic activity when administered to animals and may thus be of value for the control of blood-sucking parasites e.g. fleas, warble flies etc.

Some of the compounds also exhibit systemic properties in plants. By this we mean that they are absorbed by growing plants, and retain their activity in the plants, so that insects feeding upon these plants are killed.

In general, the compounds of the invention exhibit substantially no undesirable toxic symptoms towards hosts at the application rates necessary to utilise their pesticidal properties. Thus at these rates the compounds are substantially non-phytotoxic towards plants and non-irritant and non-toxic to animals. For example we have applied them to a wide range of crops such as apples, celery, tomatoes, broad beans and french beans, and found substantially no damage.

A very important characteristic of the compounds of the invention is their favorable mammalian toxicity. Many of the known carbamate insecticides, whilst possessing very high activity, suffer from the severe disadvantage of exhibiting high mammalian toxicity. In a number of cases, this has completely prevented the commercial exploitation of the compounds. We have found that the compounds of the invention (general Formula I is reproduced here for ease of comparison)

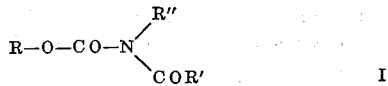

in general exhibit very much lower mammalian toxicity than do the parent compounds of general Formula IA

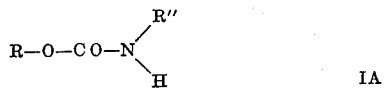

whilst still possessing very high insecticidal activity. Our new compounds (general Formula I) possess activity almost as high as, equal to or greater than that possessed by corresponding compounds of the same configuration but containing a hydrogen atom in place of the R'CO— group (general Formula IA). It is very surprising and unexpected to find that the acylation of carbamate insecticides results in compounds showing little or no diminution of insecticidal activity but a very appreciable decrease in mammalian toxicity.

It is known that carbamate insecticides frequently exhibit a marked selectivity in their activity towards insects. Thus a compound may be highly active against one insect species and almost inactive against another. It is not possible to deduce from the chemical structure whether a compound will be active or not against any particular insect. We have found that the compounds of the invention (Formula I) frequently exhibit a different spectrum of activity compared with the corresponding compounds of Formula IA. In many cases this is advantageous as it can render possible the efficient control of certain pests without the undesired elimination of useful insects, e.g. predators, bees, etc. We have also found that in some cases, the type of activity exhibited by the compounds of the invention is of a different nature to that possessed by corresponding compounds of general Formula IA. Thus for example systemic activity in animals or plants may be greatly decreased or increased.

Generally speaking the most active compounds of the invention are those in which R″ is a methyl group, and accordingly this class of compound is the preferred class.

The nature of the radical R greatly influences the activity of the compounds; for example, we have found that a slight variation in a phenyl nucleus, either in the structure of a substituent therein or in its position in the ring, produces profound changes in the biological characteristics of the compounds. The most active compounds include those in which R is alpha-naphthyl, 3-ethylphenyl, 2-isopropylphenyl, 3-isopropylphenyl, 2-sec.butylphenyl, 2-isobutylphenyl, 3-tert.butylphenyl, 3,5-ditert.butylphenyl, 2-isopropyl-5-methylphenyl, 5-isopropyl-2-methylphenyl, 2,3,5-trimethylphenyl, 4-dimethylamino-3,5-dimethylphenyl, 2 - cyclopentylphenyl, 2- phenyl, 2 - isopropoxyphenyl, 2 - methylthiophenyl, 2-chloro-4,5-dimethylphenyl, 4-methylthio - 3,5 - dimethylphenyl, 2 - allylphenyl, 3-sec.butyl, 2-methyl-4,6-dinitrophenyl and 2-(cyclopent-2-enyl)phenyl, and R″ is methyl. It must be appreciated that these compounds are not all equally active against any particular insect. However we have found that compounds of this type do possess particularly high activity against at least one insect. They are not all of equal practical value, in view of the fact that many factors other than degree of activity, such as for example persistence, ease and cost of manufacture, ease of formulation, mammalian toxicity, etc., must be considered, and that the compound most suited for the control of one pest may not necessarily be, and rarely is, most suited for the control of another pest. Compounds within general Formula I which possess many of the features desired in a commercial insecticide are those in which R represents 2-isopropylphenyl, 2-isopropoxyphenyl, 2-sec.-butylphenyl, 2-allylphenyl, 3-isopropylphenyl, 3-sec.butylphenyl and 3-tert.butylphenyl, and this is a preferred group. Typical compounds of this group are the following (in order to avoid repetition, the compounds are not listed by their full names, but by means of their values of R and R'CO in general Formula I):

R=2 - isopropylphenyl, 2 - isopropoxyphenyl, 2-sec.butylphenyl, 2-allylphenol, 3-isopropylphenyl, 3-sec.butylphenyl, and 3-tert.butylphenyl.

R'CO=methoxyacetyl, ethoxyacetyl, decyloxyacetyl, ethoxyethoxyacetyl, butoxyethoxyacetyl, methylthioacetyl, methylsulphinylacetyl methylsulphonylacetyl, benzenesulphonylacetyl, toluenesulphonylacetyl, phenoxyacetyl, p-chlorophenoxyacetyl, o- and p-tolyloxyacetyl, o- and p - methoxyphenoxyacetyl, phenylthioacetyl, p - chlorophenylthioacetyl, o- and p-tolylthioacetyl, o- and p-methoxyphenylthioacetyl, thiocyanatoacetyl, γ - methoxycarbonylbutyryl, β-methoxycarbonylpropionyl, dimethylaminoacetyl (methochloride), diethylaminoacetyl (ethochloride, ethyl sulphate or ethyl p-toluenesulphonate), sulphoacetyl, ethoxalyl, beta-(p-nitrophenyl)-propionyl and beta - (p - aminophenyl)propionyl and chloroacetyl.

For any particular value of R, one acyl group R'CO may produce a compound of greatest activity against one insect whereas another acyl group may produce a compound of greatest activity against another insect. The value of R'CO may influence the intrinsic activity, systemic properties and persistence of compounds with any particular value of R. We have found, for example, that compounds in which R is 2-isopropylphenyl or 2-isopropoxyphenyl and R'CO is one of the types of radical designated (c) to (p) in the foregoing description possess systemic aphicidal properties superior to those possessed by similar compounds in which R is a simple alkanoyl radical e.g. acetyl.

According to a further feature of the invention there are provided pesticidal compositions which comprise a compound of the hereinbefore described general Formula I in association with a conventional pesticide adjuvant.

The term "conventional pesticide adjuvant" used in this specification is to be interpreted as meaning any diluent or carrier which may be used for the formulation of pesticidal compounds. Typical adjuvants include dispersing agents, emulsifying agents, wetting agents, pulverulent solid dusting powders, volatile propellents and ignitable slow-burning compositions.

The compositions of the invention may take a variety of forms and include dusting powders, granular solids, dispersions, emulsions, smokes and aerosols. In particular the dispersions and emulsions may be supplied to the consumer as such and at the required concentration of active material or they may be supplied as primary compositions which require the addition of water either to dilute them to the desired concentration of active ingredient or actually to form the dispersion or emulsion. The invention includes both the primary and the final compositions.

The concentration of the active material in the primary compositions which may be provided for the preparation of any of the forms in which the compositions of the present invention may be used may vary widely. For example the amount of active material present in a finely ground dispersible powder may be limited to less than 50% if the active material has a relatively low melting point and tends to melt in the grinding and mixing process. On the other hand if it has a relatively high melting point a dispersible powder containing up to 90% or more of the active material may be prepared satisfactorily. Restrictions depending on the physical properties of the active ingredient also apply in the case of e.g. solutions and emulsions, etc. When preparing the primary compositions the practicability of making highly concentrated mixtures, i.e. mixtures containing up to 90% or more of the active material must be considered for its obxiously desirable to supply the consumer with a mixture having as high a concentration as is possible. It would be uneconomical to apply the primary compositions in their concentrated forms and it is perferred to apply mixtures containing less than 20% of the active material. For very light applications mixtures containing 0.001% of the active ingredient may be used but generally the preferred compositions for application in the field contain from 0.05 to 10% of the active ingredient.

When compositions of the present invention are provided as dusting powders they comprise one or more of the active compounds having the foregoing general Formula I intimately mixed with a pulverulent solid diluent, the mixture containing up to 90% w./w. of the active component. Granular solids comprise an active ingredient associated with similar diluents to those which may be employed in the dusting powder compositions, but the mixture is granulated by known methods.

As dispersions, the compositions of the present invention comprise essentially one or more of the active compounds having the foregoing general Formula I dispersed in an aqueous medium. It is convenient to supply the consumer with a primary composition which may be diluted with water to form a dispersion having the desired concentration; the primary composition may be in any one of the following forms.

It may be provided as a dispersible powder comprising the active ingredient and a suspending or dispersing agent, which powder forms a dispersion when mixed with water.

In another form the primary composition may be supplied as a solution of the active ingredient in a water-miscible solvent, e.g. acetone, with a dispersing agent, which solution forms a dispersion when diluted with water.

A further primary composition comprises an active compound having the foregoing general Formula I in the form of a finely ground powder in association with a dispersing agent and intimately mixed with water to give a paste or cream which forms a dispersion when diluted with water.

The above mentioned cream or paste comprising a finely ground active ingredient may be added to an emulsion of oil in water to give yet another type of primary composition which is a dispersion of the active compound in an aqueous oil emulsion, which may be further diluted with water before use.

The compositions of the present invention which are provided as emulsions consist essentially of one or more of the active compounds having the foregoing general Formula I dissolved in a solvent which is formed into an emulsion in the presence of an emulsifying agent with water. An emulsion of the desired concentration may be formed from a primary composition and the primary composition may be in one of the following forms.

It may be supplied as a concentrated stock emulsion which comprises an active ingredient having the foregoing general Formula I in combination with an emulsifying agent, water and a water-immiscible organic solvent, for example xylene.

Another primary composition suitable for preparing emulsions may consist of the active ingredient in an organic solvent and mixed with an emulsifying agent so that an emulsion is formed when the primary composition is diluted with water.

The aerosol compositions of the present invention include (1) a solution of an active ingredient in a volatile solvent such as acetone, together with, if desired, a small amount of a non-volatile oil such as a vegetable oil and (2) a solution of an active ingredient in a high boiling aromatic solvent; if the solubility of the active ingredient in this solvent is low, it may be necessary to add a supplementary solvent such as cyclohexanone or acetone. Such compositions are readily dispersed as aerosols either by mechanical means or by incorporating therein a volatile propellent such as Freon (a mixture of chlorofluoro derivatives of methane and ethane).

Compositions suitable for the generation of pesticidal smokes comprise a compound of the foregoing general Formula I in association with an ignitible slow-burning composition so that a smoke containing the active ingredient is generated when the composition is ignited. Thus such compositions may contain a fuel, for example sucrose, a source of oxygen, for example potassium chlorate, and a dampener, for example kaolin, to control the rate of burning.

In addition to the ingredients already mentioned the compositions of the invention may also contain other substances conventionally used in the art, the function of which may be to improve the handleability of the compositions or to improve their utility. For example an inert diluent such as kaolin may be used in the formulation for the preparation of a dispersible powder in order to facilitate mixing of the components and to provide sufficient bulk for mixing with water. As a further example the compositions intended for dilution with water prior to application may also contain a wetting agent in order to ensure satisfactory coverage of the leaves of the plants or trees to be treated. Also when dusts are prepared a lubricant such as magnesium stearate may be added to the mixture to promote both easier mixing of the components and to ensure that the final product has free flowing properties. Conventional "stickers," such as polyvinyl alcohol, colloid-like materials e.g. silicic acid, bentonite, casein etc., may also be included in the compositions of the invention to improve the persistence of the pesticide after application.

The compositions hereinbefore described wherein the active ingredients are present in solid form e.g. dusting powders and dispersible powders, should preferably contain the active ingredients in the form of very fine particles; the majority of the particles, of the order of at least 95%, should be less than $50\mu$, with about 75% of them being $5-20\mu$. The adjuvants conventionally used in such compositions are generally of this particle size or smaller. The compositions can be prepared by means of conventional grinding equipment such as a hammer mill.

Other pesticides such as D.D.T., benzene hexachloride, dinocap, dinoseb dimethacrylate, and sulphur may be incorporated in the compositions of the invention.

By suitable variation of the nature of the adjuvants and their proportion, the compositions hereinbefore described may be adapted to enable the properties of any particular active ingredient to be utilised. Thus for example, in the case of an active ingredient possessing the properties necessary for the control of parasites on animals e.g. sheep blowfly larvae on sheep or cattle ticks on cattle, the compositions supplied to the user would preferably be dispersible powders or miscible liquids in which the nature of the adjuvants and their proportions are such that on dilution with an appropriate quantity of water, stable aqueous compositions are produced which are suitable for the treatment of the animals by the standard procedures of dipping or spraying. Alternatively, in the case of an active ingredient possessing properties making it useful for the control of pests which attack horticultural or agricultural crops, the user would be supplied with compositions in which the nature of the adjuvants and their proportion suited application to dormant or growing plants or the ground in which the plants are growing or are to be grown. The types of compositions useful for any desired purpose will be clear to those skilled in this art.

With regard to compositions, some of the compounds of the invention are oils, which render them particularly suitable for formulation as miscible liquids. This type of formulation is beneficial in some instances, for example in the production of animal dips and in the production of sprayable liquids intended to be applied from aircraft.

According to a further feature of the invention there is provided a process for controlling pests which process comprises applying to the pests or their loci a pesticidally effective amount of a compound of general Formula I. In accordance with this embodiment of the invention, crops such as fruit trees, potatoes, cotton, etc. may be treated in order to control insects, acari and fungi; animals may be dipped, sprayed or dosed in order to control parasites thereon; and the breeding grounds and habitats of pests injurious to public health, such as mosquitos, may be treated. Clearly the application rates will depend on the particular compound, the pest to be controlled, and other variable factors and accordingly it is not possible to designate an application rate suitable for all conditions of use. However, the rate of application of crops would normally lie within the range of 0.1–500 lb./acre, with 0.1–10 lb./acre covering most spraying operations. In the case of the treatment of animals in order to control parasites thereon, treatment by conventional means such as dipping or spraying would require the use of a composition of concentration 0.005–1%.

The pesticidal activity of the compounds of the invention.—This has been demonstrated in a number of tests which are recorded in Table I, in which the pests are identified by the code letters A to G and in which blank spaces indicate that no test was made, and in Tables II to X. The tests carried out were as follows:

(a) Against aphis (code letter A).—Broad bean plants are grown singly in pots, and when 5 to 7.5 cm. tall, they are infested with aphis (*Megoura viciae*) and sprayed to run off with an aqueous emulsion or suspension of the compound under test. After 24 hours, assessment is carried out by counting the number of dead and alive aphis. Initially the compounds are tested at a concentration of 2000 p.p.m.; those showing sufficient activity are then tested at lower concentrations, 500 p.p.m. and 100 p.p.m.

In Table I, the results are shown for a number of compounds of the invention, their effectiveness being shown by assigning to each a grade as follows:

(1) Greater than 50% mortality at 100 p.p.m.
(2) 50% or less at 100 p.p.m. but greater than 50% at 500 p.p.m.
(3) 50% or less at 500 p.p.m. but greater than 25% at 2000 p.p.m.
(4) 25% or less at 2000 p.p.m.

(b) Against caterpillars (code letter B).—Ten 4th instar larvae of *Plutella maculipennis* are placed in tubes. Approximately 6.5 sq. cm. of cabbage leaf is dipped into an aqueous dispersion or emulsion of the compound under test, allowed to dry and placed in the tubes, one piece to each tube. After 24 hours, untreated cabbage leaf is added for food and the effectiveness of the compound is assessed 24 hours later by counting the numbers of dead larvae.

In Table I, the results are shown for a number of compounds of the invention, their effectiveness being shown by assigning to each a grade as follows:

(1) Greater than 50% mortality at 1000 p.p.m.
(2) 50% or less at 1000 p.p.m., but greater than 50% at 2500 p.p.m.
(3) 50% or less at 2500 p.p.m., but greater than 25% at 5000 p.p.m.
(4) 25% or less at 5000 p.p.m.

(c) Against beetles (code letter C).—Using *Phaedon cochleariae* and mustard leaf in place of caterpillars and cabbage leaf, this test is carried out as (b) above. Activities are reported in Table I as follows:

(1) Greater than 50% mortality at 250 p.p.m.
(2) 50% or less at 250 p.p.m. but greater than 50% at 1000 p.p.m.
(3) 50% or less at 1000 p.p.m. but greater than 25% at 5000 p.p.m.
(4) 25% or less at 5000 p.p.m.

(d) Against adult sheep blowfly (code letter D).—Filter papers, 9 cm. in diameter, are treated with 0.5 ml. of 0.5% w./v. acetone solutions of the compounds under test. After drying the papers are placed in Petri dishes, 1 paper per dish, and 15 adult sheep blowflies are introduced into each dish. The mortality is recorded after 24 hours. If warranted, further tests with acetone solutions of lower concentrations are carried out.

Results are shown in Table I for several compounds of the invention as follows:

1. $L.D._{50}$ approximately 0.025%.
2. $L.D._{50}$ between 0.5% and 0.05%.
3. $L.D._{50}$ above 0.5%.
4. No activity.

(e) Against sheep blowfly larvae (code letter E).—Cotton wool plugs are treated with 0.5 ml. of 0.05% w./v. solutions of the compounds under test. After the acetone has evaporated, 20–30 sheep blowfly larvae are placed on the wool which, together with sterile sheep serum for nutrient, is kept in a glass container for 24 hours. The mortality of the larvae is recorded after this time.

Results are shown in Table I for several compounds of the invention as follows:

1. $L.D._{50}$ between 0.0125% and 0.003125%.
2. $L.D._{50}$ between 0.025% and 0.05%.
3. $L.D_{50}$ above 0.05%.
4. No activity.

(f) Against cattle tick larvae (code letter F).—
(i) Glass tubes, 5 cm. x 2.5 cm. open at both ends, are lined with filter papers 4.2 x 4.8 cm. The paper is treated with 0.15 ml. of an acetone solution of the compound under test. After allowing to dry, 20 *Boophilus microplus* larvae are introduced into each tube, which are sealed with fine mesh. Mortality is recorded after 72 hours.

(ii) Compounds showing high activity in test (i) are examined further. By means of a Tattersfield spraying tower, 1 ml. of an aqueous suspension of a compound under test is sprayed evenly over 20–30 cattle tick larvae. After drying, the larvae are sucked into tubes and the percentage mortality recorded after 24 hours.

In Table I, the results are shown as follows:

(1) Active in Test (ii) at concentrations of 0.025% and below. $L.D._{50}$'s approximately 0.0125% or below in this test.
(2) Not active in Test (ii). $L.D._{50}$ in test (i) approximately 0.005%.
(3) Slight activity only in Test (i).
(4) No activity.

(g) Against adult mosquitos (code letter G).—Filter papers, 9 cm. in diameter, are treated with 1 ml. of acetone solutions of the compounds under test, and placed in 9 x 2 cm. glass tubes. Adult yellow fever mosquitos (*Aedes aegypti*), 20 per tube, are introduced into the tubes. After 1 hour, the mosquitos are anaesthetised with carbon dioxide and transferred to cartons and the mortality recorded 24 hours later.

In Table I, results are shown as follows:

(1) $L.D._{50}$ approximately 0.01% or less.
(2) $L.D._{50}$ approximately 0.025%.
(3) Some activity at 0.1%.
(4) No activity at 0.1%.

To summarize the code letters used in Table I:
A—Aphis (*Megoura viciae*)
B—Caterpillars (*Plutella maculipennis*)
C—Beetles (*Phaedon cochleariae*)
D—Adult sheep blowfly
E—Sheep blowfly larvae
F—Cattle tick larvae (*Boophilus microplus*)
G—Adult mosquitos (*Aedes aegypti*).

TABLE I

Compound R—O—CO—N(R'')(COR')    Activity

| R | R'' | —COR' | A | B | C | D | E | F | G |
|---|---|---|---|---|---|---|---|---|---|
| Phenyl | CH₃ | Acetyl | 4 | 3 | 4 | 2 | 3 | 3 | 4 |
| 2-methylphenyl | CH₃ | do | 3 | 4 | 3 | 2 | 3 | 3 | 3 |
| 3-methylphenyl | CH₃ | do | 4 | 2 | 3 | 2 | 3 | 3 | 2 |
| 2-ethylphenyl | CH₃ | do | 2 | 4 | 3 | 3 | 3 | 4 | 3 |
| 3-ethylphenyl | CH₃ | do | 4 | 3 | 1 | 2 | 3 | 3 | 1 |
| 2-isopropylphenyl | CH₃ | Formyl | 2 | 3 | 3 | 2 | 1 | 2 | 3 |
| Do | CH₃ | Acetyl | 1 | 2 | 3 | 1 | 1 | 3 | 4 |
| Do | CH₃ | Propionyl | 1 | 3 | 3 | 2 | 1 | 3 | 4 |
| Do | CH₃ | Butyryl | 1 | 2 | 3 | 2 | 1 | 2 | 4 |
| Do | CH₃ | Crotonyl | 1 | 3 | 3 | 2 | 2 | 3 | 4 |
| Do | CH₃ | Hexanoyl | 1 | 4 | 3 | 4 | 1 | 3 | |
| Do | CH₃ | Dodecanoyl | 1 | 3 | 4 | | | | |
| Do | CH₃ | α,β-Dibromobutyryl | 1 | 4 | 3 | 3 | 2 | 2 | |
| 3-isopropylphenyl | CH₃ | Acetyl | 3 | 2 | 1 | 2 | 2 | 2 | 1 |
| Do | CH₃ | Propionyl | 3 | 2 | 1 | 2 | 1 | 1 | 1 |
| Do | CH₃ | Butyryl | 2 | 1 | 1 | 1 | 1 | 1 | 4 |
| Do | CH₃ | Hexanoyl | 2 | 2 | 1 | 4 | 1 | 2 | 4 |
| 4-isopropylphenyl | CH₃ | Acetyl | 3 | 4 | 4 | 3 | 3 | 3 | 2 |
| 2-allylphenyl | CH₃ | do | 2 | 3 | 3 | 2 | 2 | 4 | |
| 2-sec.butylphenyl | CH₃ | do | 1 | 3 | 4 | 2 | 2 | 3 | 2 |
| 2-isobutylphenyl | CH₃ | do | 2 | 4 | 4 | 2 | 1 | 3 | |
| 3-tert.butylphenyl | CH₃ | do | 4 | 2 | 1 | 2 | 2 | 3 | 4 |
| Do | CH₃ | Propionyl | 4 | 1 | 1 | 2 | 2 | 1 | 4 |
| Do | CH₃ | Butyryl | 2 | 2 | 2 | 3 | 2 | 1 | 2 |
| 2-cyclohexylphenyl | CH₃ | Formyl | 3 | 4 | 4 | 4 | 2 | 3 | 4 |
| Do | CH₃ | Acetyl | 3 | 4 | 4 | 4 | 3 | 3 | 3 |
| 2-cyclopentyl | CH₃ | do | 1 | 4 | 4 | 3 | 1 | 3 | |
| 2-(cyclopent-2-enyl)phenyl | CH₃ | do | 2 | 3 | 3 | 4 | 1 | 2 | 4 |
| 3,5-dimethylphenyl | CH₃ | do | 4 | 3 | 2 | 2 | 3 | 3 | |
| 2,3-dimethylphenyl | CH₃ | do | 3 | 4 | 3 | 2 | 2 | 4 | 2 |
| 2,5-dimethylphenyl | CH₃ | do | 4 | 4 | 3 | 2 | 3 | 3 | |
| 3,5-ditert.butylphenyl | CH₃ | do | 3 | 4 | 3 | 4 | 1 | 4 | 4 |
| 2-isopropyl-5-methylphenyl | CH₃ | do | 2 | 4 | 4 | 2 | 1 | 3 | 4 |
| 5-isopropyl-2-methylphenyl | CH₃ | do | 2 | 3 | 3 | 3 | 1 | 2 | 2 |
| 2-methyl-4,6-dinitrophenyl | CH₃ | do | 3 | 2 | 3 | 4 | 3 | 4 | |
| 2,3,5-trimethylphenyl | CH₃ | Formyl | 3 | 4 | 2 | 4 | 1 | 3 | 4 |
| Do | CH₃ | Acetyl | 3 | 4 | 1 | 2 | 2 | 4 | 4 |
| Do | CH₃ | Propionyl | 2 | 3 | 1 | 1 | 1 | 1 | 4 |
| Do | CH₃ | Butyryl | 2 | 4 | 1 | 3 | 2 | 1 | 4 |
| 2-biphenylyl | CH₃ | Acetyl | 2 | 3 | 1 | 4 | 3 | 3 | |
| 4-dimethylamino-3,5-dimethylphenyl | CH₃ | do | 3 | 1 | 1 | 2 | 1 | 3 | 2 |
| 2-methoxyphenyl | CH₃ | do | 3 | 3 | 4 | 2 | 3 | 3 | 4 |
| 2-ethoxyphenyl | CH₃ | do | 2 | 4 | 4 | 1 | 1 | 3 | 2 |
| 2-isopropoxyphenyl | CH₃ | do | 1 | 2 | 3 | 1 | 1 | 2 | 2 |
| Do | CH₃ | Propionyl | 1 | 2 | 3 | 2 | 1 | 1 | 2 |
| Do | CH₃ | Butyryl | 1 | 3 | 3 | 2 | 1 | 1 | 4 |
| 1-naphthyl | CH₃ | Formyl | 2 | 4 | 3 | 4 | 2 | 3 | 4 |
| Do | CH₃ | Acetyl | 1 | 3 | 1 | 4 | 2 | 3 | 4 |
| Do | CH₃ | Propionyl | 1 | 3 | 2 | 4 | 1 | 3 | 4 |
| Do | CH₃ | Butyryl | 1 | 4 | 2 | 4 | 2 | 3 | 4 |
| 1-naphthyl | CH₃ | Dichloroacetyl | 1 | 2 | 2 | 4 | 1 | 1 | 4 |
| 2-methylthiophenyl | CH₃ | Acetyl | 1 | 4 | 3 | 2 | 1 | 4 | 4 |
| 2-chloro-4,5-dimethylphenyl | CH₃ | do | 1 | 3 | 2 | 4 | 3 | 4 | 2 |

(h) Against codling moth larvae.—Two small apples are dipped in a 0.005% aqueous dispersion of the compound under test and allow to dry. Five newly emerged larvae of Cydia pomonella are placed on each fruit which are put into jars and kept at 24° C. After 48 hours the fruits are assessed for significant entries by the larvae. The percentage of larvae not entering the fruit is recorded as the percentage mortality. Some results are shown in Table II.

TABLE II

| R | R'' | R'CO | Percent mortality |
|---|---|---|---|
| 3-isopropylphenyl | CH₃ | Acetyl | 87 |
| Do | CH₃ | Propionyl | 100 |
| Do | CH₃ | Butyryl | 73 |
| 3-tert.butylphenyl | CH₃ | Acetyl | 87 |
| Do | CH₃ | Propionyl | 60 |
| 2-sec.butylphenyl | CH₃ | Acetyl | 60 |
| 4-dimethylamino-3,5-dimethylphenyl | CH₂ | do | 100 |
| 3-ethylphenyl | CH₃ | do | 60 |
| 2-chloro-4,5-dimethylphenyl | CH₃ | do | 87 |

(i) Against *Pieris brassicae*.—Small pieces of cabbage are dipped into a 0.0125% aqueous dispersion of the compound under test and allowed to dry. Five 2nd instar larvae are placed in small tubes and a piece of treated cabbage placed in each tube. After 24 hours, a small piece of untreated cabbage is added for food and the percentage mortality is recorded 24 hours later. Some results are shown in Table III.

TABLE III

| R | R'' | R'CO | Percent Mortality |
|---|---|---|---|
| 2-isopropylphenyl | CH₃ | Acetyl | 100 |
| Do | CH₃ | Propionyl | 89 |
| Do | CH₃ | Formyl | 56 |
| Do | CH₃ | Hexanoyl | 89 |
| 3-isopropylphenyl | CH₃ | Acetyl | 89 |
| Do | CH₃ | Propionyl | 100 |
| Do | CH₃ | Butyryl | 100 |
| Do | CH₃ | Hexanoyl | 100 |
| 3-tert.butylphenyl | CH₃ | Acetyl | 100 |
| Do | CH₃ | Propionyl | 78 |
| Do | CH₃ | Butyryl | 100 |

(j) Against cotton stainer bug.—Five female nymphs of *Dysdercus fasciates* are placed in small tubes, which are placed in a refrigerator to inactivate the insects prior to treating their ventral abdomens with 0.6 μl. of a 0.05% aqueous suspension of the compound under test. After treatment the tubes are stored at 24° C. and mortality recorded after 24 hours. Some results are shown in Table IV.

TABLE IV

| R | R″ | R′CO | Percent mortality |
|---|---|---|---|
| 2-isopropylphenyl | CH₃ | Acetyl | 60 |
| Do | CH₃ | Propionyl | 60 |
| Do | CH₃ | Formyl | 89 |
| 2-sec.butylphenyl | CH₃ | Acetyl | 70 |
| 1-naphthyl | CH₃ | ----do---- | 70 |
| Do | CH₃ | Dichloroacetyl | 80 |
| Do | CH₃ | Formyl | 89 |
| 3-tert.butylphenyl | CH₃ | Propionyl | 70 |
| 2-cyclopentylphenyl | CH₃ | Acetyl | 70 |
| 2-sec.butylphenyl | CH₃ | ---do--- | 70 |
| 2-ethoxyphenyl | CH₃ | ---do--- | 78 |
| 4-dimethylamino-3,5-dimethylphenyl | CH₃ | ---do--- | 60 |

(k) Against Cockroaches.—Five adult male cockroaches (*Blatella germanica*) are enclosed in jars, inactivated by means of carbon dioxide and 0.2 μl. of a 5% organic solvent solution of the compound under test applied to the ventral abdomens. Mortality is recorded after 24 hours. Some results are shown in Table V.

TABLE V

| R′ | R″ | R′CO | Percent mortality |
|---|---|---|---|
| 2-isopropylphenyl | CH₃ | Formyl | 60 |
| 1-naphthyl | CH₃ | ---do--- | 60 |
| Do | CH₃ | Dichloroacetyl | 70 |
| 2-methyl-4,6-dinitrophenyl | CH₃ | Acetyl | 90 |
| 2-ethoxyphenyl | CH₃ | ---do--- | 60 |
| 2-isopropoxyphenyl | CH₃ | Butyryl | 90 |

(l) Against slugs.—Filter papers, 4.5 sq. cm., are impregnated with a 0.05% acetone solution of the test compound, dried, and placed one to each glass jar containing five slugs. Sufficient water was added to dampen the paper, and then a disc of French bean plant placed in the centre of the filter paper. This was examined for feeding after 48 hours and the percentage mortality calculated. Some results are shown in Table VI.

TABLE VI

| R | R″ | R′CO | Percent mortality |
|---|---|---|---|
| 2-isopropylphenyl | CH₃ | Butyryl | 100 |
| 2-cyclohexylphenyl | CH₃ | Acetyl | 100 |
| 2-methyl-4,6-dinitrophenyl | CH₃ | ----do---- | 100 |

(m) Against red spider.—Fifteen adult mites (*Tetranychus telarius*) are placed on single bean leaves with the petioles immersed in tubes of water. After 24 hours, the leaves are sprayed on both sides with 0.1% aqueous dispersion of the test compounds. Mortality is assessed after 48 hours. Some results are shown in Table VIII.

TABLE VII

| R | R″ | R′CO | Percent mortality |
|---|---|---|---|
| Phenyl | CH₃ | Acetyl | >25 |
| 3-methylphenyl | CH₃ | ----do---- | >25 |
| 2-ethylphenyl | CH₃ | ----do---- | >25 |
| 3-ethylphenyl | CH₃ | ----do---- | >25 |
| 2-isopropylphenyl | CH₃ | Butyryl | >50 |
| Do | CH₃ | Crotonyl | >25 |
| 3-isopropylphenyl | CH₃ | Butyryl | >25 |
| 3-tert.butylphenyl | CH₃ | ----do---- | >25 |
| 2-cyclohexylphenyl | CH₃ | Formyl | >25 |
| 2,3-dimethylphenyl | CH₃ | Acetyl | >50 |
| 2,3,5-trimethylphenyl | CH₃ | ----do---- | >25 |
| 1-naphthyl | CH₃ | Formyl | >25 |
| 2-isopropoxymethyl | CH₃ | Acetyl | >50 |

(n) Against fungi.—On a glass slide a deposit of known weight of test compound is formed by allowing 0.25 ml. of an acetone solution of known concentration to evaporate. Spores of *Venturia inaequalis* in suspension are set on these deposits (0.05 ml. of a 50,000 spores/ml. suspension) to germinate and after 18 hours incubation the percentage germination is noted. In Table VIII some results are shown as approximate L.D.₅₀'s, being concentrations in parts per million of the acetone solution of the compound under test which it is estimated would inhibit 50% of the spores from germinating.

TABLE VIII

| R | R″ | R′CO | Approx. L.D.₅₀ |
|---|---|---|---|
| 3-methylphenyl | CH₃ | Acetyl | 12 |
| 3-ethylphenyl | CH₃ | ---do--- | 12 |
| 3-isopropylphenyl | CH₃ | Propionyl | 12 |
| Do | CH₃ | Butyryl | 12 |
| 2-sec.butylphenyl | CH₃ | Acetyl | 12 |
| 3-tert.butylphenyl | CH₃ | ---do--- | 12 |
| 2-cyclohexyl-4-methylphenyl | CH₃ | ---do--- | 6 |

(o) Systemic activity.—Two 20 g. mice are dosed by oral intubation with 300 mg./kg. of the test compound (if toxicity allows) and 5 hours later, 30 unfed stable flies (*Stomexys calcitrans*) are exposed to the anaesthetised mice. After feeding, the flies are placed in tubes and mortality checked after 24 hours. Table IX shows some results in this test.

TABLE IX

| R | R″ | R′CO | Dose, mg./kg. | Percent mortality |
|---|---|---|---|---|
| 3-isopropylphenyl | CH³ | Butyryl | 300 | 50 |
| 3-isopropyl-2-methylphenyl | CH³ | Acetyl | 300 | 100 |
| 2,3,5-trimethylphenyl | CH³ | Formyl | 300 | 30 |

(p) In Table X, the results are shown for 1-naphthyl N-acetyl-N-methylcarbamate and 1-naphthyl N-methylcarbamate against *Phaedon cochleariae* and *Pieris brassicae* in tests carried out as previously described, in order to illustrate the improved activity of the former over the latter at different concentrations of these chemicals. It has also been noted that whereas 1-naphthyl N-methylcarbamate is stimulatory to red spiders, 1-naphthyl N-acetyl-N-methylcarbamate has a suppressant action.

TABLE X

| Compound | Percent kill at stated concentrations | | | | |
| | Phaedon cochleariae | | | Pieris brassicae | |
| | 0.1% | 0.05% | 0.025% | 0.1% | 0.05% |
|---|---|---|---|---|---|
| 1-naphthyl N-acetyl N-methylcarbamate | 100 | 95 | 61 | 100 | 33 |
| 1-naphthyl N-methylcarbamate | 90 | 75 | 38 | 68 | 5 |

In Tables XI–XV, there are shown more results obtained in conventional tests against the specified pests.

(a) Contact activity against aphis (*Megoura viciae*):

TABLE XI

| R | R′CO | Approximate L.D.₅₀ (percent solution) |
|---|---|---|
| 2-sec.butylphenyl | Methylthioacetyl | 0.001 |
| Do | Methoxyacetyl | 0.00125 |
| Do | Thiocyanatoacetyl | 0.002 |
| Do | γ-Methoxycarbonylbutyryl | 0.002 |
| 2-isopropylphenyl | Methoxyacetyl | 0.0005 |
| Do | γ-Methoxycarbonylbutyryl | 0.00125 |

(b) Systemic activity against aphis (*Megoura viciae*):

TABLE XII

| R | R'CO | Approximate L.D.₅₀ (percent solution) |
|---|---|---|
| 2-isopropoxyphenyl | Methoxyacetyl | 0.001 |
| Do | Methylthioacetyl | 0.002 |
| Do | γ-Methoxycarbonylbutyryl | 0.002 |
| Do | Diethylaminoacetyl (ethochloride) | 0.00125 |
| Do | Benzenesulphonylacetyl | 0.004 |
| Do | β-Methoxycarbonylpropionyl | 0.002 |
| Do | p-Chlorophenoxyacetyl | 0.002 |
| Do | Methylsulphonylacetyl | 0.0025 |
| Do | Thiocyanatoacetyl | 0.00125 |
| Do | Benzyloxyacetyl | 0.004 |
| Do | Chloroacetyl | 0.001 |
| 2-isopropylphenyl | Methoxyacetyl | 0.0025 |
| Do | Chloroacetyl | 0.002 |
| Do | Methylthioacetyl | 0.005 |
| Do | γ-Methoxycarbonylbutyryl | 0.008 |
| Do | Diethylaminoacetyl (ethochloride) | 0.003 |
| Do | p-Chlorophenoxyacetyl | 0.008 |
| Do | Thiocyanatoacetyl | 0.005 |
| Do | β-(p-nitrophenyl) propionyl | 0.0125 |
| Do | β-(p-aminophenyl) propionyl | 0.02 |

(c) Activity against 4th instar larvae of *Plutella maculipennis*:

TABLE XIII

| R | R'CO | Approximate L.D.₅₀ (percent solution) |
|---|---|---|
| 3-isopropylphenyl | Methoxyacetyl | 0.04 |

(d) Activity against the larvae of sheep blowfly:

TABLE XIV

| R | R'CO | Approximate L.D.₅₀ (percent solution) |
|---|---|---|
| 3-isopropylphenyl | Methylthioacetyl | 0.006 |
| Do | Methoxyacetyl | <0.003 |
| Do | Diethylaminoacetyl (ethochloride) | <0.003 |
| Do | Chloroacetyl | <0.003 |
| 2-sec.butylphenyl | Diethylaminoacetyl (ethochloride) | 0.005 |
| Do | Methoxyacetyl | <0.003 |
| 3-tert.butylphenyl | Methoxyacetyl | 0.01 |
| Do | Diethylaminoacetyl (ethochloride) | 0.01 |
| Do | Chloroacetyl | 0.003 |
| 3-sec.butylphenyl | Methoxyacetyl | 0.003 |
| Do | Diethylaminoacetyl (ethochloride) | <0.003 |
| Do | Chloroacetyl | <0.003 |

(e) Activity against mosquito larvae (*Aedes aegypti*):

TABLE XV

| R | R'CO | Approximate L.D.₅₀ (p.p.m.) |
|---|---|---|
| 3-sec. butylphenyl | Methylthioacetyl | 0.07 |
| Do | Methoxyacetyl | 0.07 |
| Do | Chloroacetyl | 0.07 |
| 3-tert.Butylphenyl | Methoxyacetyl | 0.625 |
| Do | Chloroacetyl | <0.625 |

The mammalian toxicity of the compounds of the invention.—This has been determined by conventional procedures; in Table XVI results are shown for a representative selection of the compounds of the invention, being recorded as the number of deaths occurring when two mice are given the compounds by oral intubation. For comparison purposes, the results are also shown for the parent carbamates wherein R'CO— is replaced by hydrogen.

TABLE XVI

| R | R'' | R'CO—or H | Dose, mg./kg. | Deaths |
|---|---|---|---|---|
| 3-methylphenyl | CH₃ | H | 1,000 | 2 |
| Do | CH₃ | Acetyl | 1,000 | 0 |
| 2-ethylphenyl | CH₃ | H | 250 | 2 |
| Do | CH₃ | Acetyl | 1,000 | 0 |
| 3-ethylphenyl | CH₃ | H | 250 | 2 |
| Do | CH₃ | Acetyl | 1,000 | 0 |
| 2-isopropylphenyl | CH₃ | H | 1,000 | 2 |
| Do | CH₃ | Acetyl | 1,000 | 0 |
| Do | CH₃ | Propionyl | 1,000 | 0 |
| Do | CH₃ | Butyryl | 1,000 | 0 |
| Do | CH₃ | Crotonyl | 1,000 | 0 |
| 3-isopropylphenyl | CH₃ | H | 60 | 2 |
| Do | CH₃ | Acetyl | 250 | 0 |
| Do | CH₃ | Propionyl | 1,000 | 0 |
| Do | CH₃ | Butyryl | 250 | 0 |
| 2-allylphenyl | CH₃ | H | 1,000 | 2 |
| Do | CH₃ | Acetyl | 1,000 | 0 |
| 2-sec.butylphenyl | CH₃ | H | 250 | 2 |
| Do | CH₃ | Acetyl | 1,000 | 0 |
| 2-tert.butylphenyl | CH₃ | H | 1,000 | 2 |
| Do | CH₃ | Acetyl | 1,000 | 0 |
| 3-tert.butylphenyl | CH₃ | H | 1,000 | 1 |
| Do | CH₃ | Acetyl | 1,000 | 0 |
| Do | CH₃ | Propionyl | 1,000 | 0 |
| Do | CH₃ | Butyryl | 1,000 | 0 |
| 3,5-dimethylphenyl | CH₃ | H | 1,000 | 2 |
| Do | CH₃ | Acetyl | 1,000 | 0 |
| 2,3-dimethylphenyl | CH₃ | H | 1,000 | 2 |
| Do | CH₃ | Acetyl | 1,000 | 0 |
| 2,5-dimethylphenyl | CH₃ | H | 60 | 2 |
| Do | CH₃ | Acetyl | 1,000 | 0 |
| 5-isopropyl-2-methylphenyl | CH₃ | H | 250 | 2 |
| Do | CH₃ | Acetyl | 1,000 | 0 |
| 2-methyl-4,6-dinitrophenyl | CH₃ | H | 250 | 2 |
| Do | CH₃ | Acetyl | 1,000 | 0 |
| 2,3,5-trimethylphenyl | CH₃ | H | 250 | 2 |
| Do | CH₃ | Formyl | 250 | 0 |
| Do | CH₃ | Acetyl | 1,000 | 0 |
| Do | CH₃ | Propionyl | 1,000 | 0 |
| 4-dimethylamino-3,5-dimethylphenyl | CH₃ | H | 30 | 2 |
| Do | CH₃ | Acetyl | 250 | 0 |
| 2-ethoxyphenyl | CH₃ | H | 1,000 | 2 |
| Do | CH₃ | Acetyl | 1,000 | 0 |
| 2-isopropoxyphenyl | CH₃ | H | 30 | 2 |
| Do | CH₃ | Acetyl | 250 | 0 |
| Do | CH₃ | Butyryl | 250 | 0 |
| 2-methylthiophenyl | CH₃ | H | 250 | 2 |
| Do | CH₃ | Acetyl | 1,000 | 0 |

The following non-limitative examples illustrate the invention:

Example 1

The compounds listed below in Table XVII were prepared as follows: The N-methylcarbamate was heated under reflux with a large excess of the appropriate anhydride to 140° C. (or to boiling point in the case of acetic anhydride) in the presence of a catalytic amount of concentrated sulphuric acid (about 2 drops per 50 ml. of anhydride) for about 30 minutes. An excess of anhydrous sodium acetate was then added to neutralise the sulphuric acid, and excess anhydride was removed by distillation in vacuo. The cooled residue was stirred with water, taken up in ether, dried over anhydrous sodium sulphate and the ether distilled. In those cases when the product was a solid, it was recrystallised from a suitable solvent e.g. light petroleum; in the cases when the product was a liquid, it was distilled in vacuo. In all cases, the composition of the final product was checked by microanalysis based on nitrogen content.

TABLE XVII $$R-O-CO-N\underset{COR'}{\overset{R''}{\diagup}}$$

| R | R'' | R'CO— | Melting or Boiling Point |
|---|---|---|---|
| Phenyl | CH₃ | Acetyl | 120–122° C./2.5 mm. |
| 2-methylphenyl | CH₃ | do | 124–128° C./2.5 mm. |
| 3-methylphenyl | CH₃ | do | 120–123° C./1.5 mm. |
| 2-ethylphenyl | CH₃ | do | 126–129° C./2 mm. |
| 3-ethylphenyl | CH₃ | do | 132–134° C./2 mm. |
| 2-isopropylphenyl | CH₃ | Formyl | 130–140° C./2 mm. |
| Do | CH₃ | Propionyl | 138–140° C./2.5 mm. |
| Do | CH₃ | Butyryl | 150° C./2.5 mm. |

TABLE XVII—Continued $$R\text{—}O\text{—}CO\text{—}N\begin{matrix}R''\\COR'\end{matrix}$$

| R | R'' | R'CO— | Melting or Boiling Point |
|---|---|---|---|
| 2-isopropylphenyl | CH₃ | Crotonyl | 150–154° C./2 mm. |
| Do | CH₃ | Hexanoyl | 164–168° C./2 mm. |
| Do | CH₃ | α,β-Dibromobutyryl | 188–192° C./2 mm. |
| Do | CH₃ | Dodecanoyl | 214–216° C./2 mm. |
| 3-isopropylphenyl | CH₃ | Acetyl | 136–140° C./2 mm. |
| Do | CH₃ | Propionyl | 146–148° C./2 mm. |
| Do | CH₃ | Butyryl | 150–151° C./2 mm. |
| Do | CH₃ | Hexanoyl | 168–172° C./2 mm. |
| Do | C₂H₅ | Acetyl | 138–142° C./1.5 mm. |
| Do | n-C₃H₇ | ----do---- | 150–154° C./2 mm. |
| 4-isopropylphenyl | CH₃ | ----do---- | 140–142° C./2 mm. |
| 2-allylphenyl | CH₃ | ----do---- | 134° C./1 mm. |
| 2-sec-butylphenyl | CH₃ | ----do---- | 134–138° C./2 mm. |
| 2-tert-butylphenyl | CH₃ | ----do---- | 135–137° C. |
| 2-iso-butylphenyl | CH₃ | ----do---- | 138–140° C./2 mm. |
| 3-sec-butylphenyl | CH₃ | ----do---- | 140–143° C./1.5 mm. |
| 3-tert-butylphenyl | CH₃ | ----do---- | 146–147° C./2 mm. |
| Do | CH₃ | Propionyl | 154–155° C./2.5 mm. |
| Do | CH₃ | Butyryl | 156–160° C./2 mm. |
| Do | CH₃ | Formyl | 165–175° C./2 mm. |
| 2-cyclohexylphenyl | CH₃ | Acetyl | 172–174° C./3 mm. |
| Do | CH₃ | ----do---- | 69.5–70.5° C. |
| 4-cyclohexylphenyl | CH₃ | ----do---- | 168–180° C./2 mm. |
| 2-cyclopentylphenyl | CH₃ | ----do---- | 172–175° C/2 mm. |
| 4-cyclopentylphenyl | CH₃ | ----do---- | 137–138° C. |
| 2-(cyclopent-2-enyl)phenyl | CH₃ | ----do---- | 63–64° C. |
| 2-cyclohexyl-4-methylphenyl | CH₃ | ----do---- | 136–140° C./2 mm. |
| 3,5-dimethylphenyl | CH₃ | ----do---- | 132–134° C./1.5 mm. |
| 2,3-dimethylphenyl | CH₃ | ----do---- | 129–133° C./2 mm. |
| 2,5-dimethylphenyl | CH₃ | ----do---- | 106–107.5° C. |
| 2,5-ditert-butylphenyl | CH₃ | ----do---- | 75–77° C. |
| 3,5-ditert-butylphenyl | CH₃ | ----do---- | 140–144° C./2 mm. |
| 2-isopropyl-5-methylphenyl | CH₃ | ----do---- | 138–142° C./2 mm. |
| 5-isopropyl-2-methylphenyl | CH₃ | ----do---- | 72–74° C. |
| 2-tert-butyl-4-methylphenyl | CH₃ | ----do---- | 102–104° C. |
| 2-methyl-4,6-dinitrophenyl | CH₃ | Formyl | |
| 2,3,5-trimethylphenyl | CH₃ | Propionyl | 152–154° C./2 mm. |
| Do | CH₃ | Butyryl | 161–163° C./3 mm. |
| Do | CH₃ | Acetyl | 160–166° C./2.5 mm. |
| 4-dimethylamino-3,5-dimethylphenyl | CH₃ | ----do---- | 140–144° C./2 mm. |
| 2-methoxyphenyl | CH₃ | ----do---- | 148° C./2 mm. |
| 2-ethoxyphenyl | CH₃ | ----do---- | 138–142° C./2 mm. |
| 2-isopropoxyphenyl | CH₃ | Propionyl | 146–150° C./2 mm. |
| 2-isopropoxyphenyl | CH₃ | Butyryl | 154–156° C./2 mm. |
| Do | CH₃ | Acetyl | 152–156° C./1 mm. |
| 3-isopropoxyphenyl | CH₃ | Propionyl | 156–162° C./1.5 mm. |
| Do | CH₃ | Butyryl | 168–174° C./2 mm. |
| Do | CH₃ | Acetyl | 80–82° C. |
| 2-benzyloxyphenyl | CH₃ | ----do---- | 91–93° C. |
| 2-N-acetyl-N-methylcarbamoylphenyl | CH₃ | Formyl | 170–180° C./2 mm. |
| 1-naphthyl | CH₃ | Dichloroacetyl | 110–110.5° C. |
| Do | CH₃ | Acetyl | 53–55° C. |
| 2-methylthiophenyl | CH₃ | ----do---- | 63–65° C. |
| 2-(p-Chlorobenzylthio)phenyl | CH₃ | ----do---- | 79–81° C. |
| 3-N-acetyl-N-methylcarbamoylphenyl | CH₃ | ----do---- | 162–170° C./1 mm. |
| 3,5-dimethoxyphenyl | CH₃ | ----do---- | 148–152° C./1.5 mm. |
| 2-chloro-4,5-dimethylphenyl | CH₃ | ----do---- | 183–185° C./2 mm. |
| 4-methylthio-3,5-dimethylphenyl | CH₃ | Propionyl | 142–146° C./2 mm. |
| 3-ethylphenyl | CH₃ | Butyryl | 152–156° C./2.5 mm. |
| Do | CH₃ | Phenoxyacetyl | 80–81° C. |
| 2-isopropylphenyl | CH₃ | Isobutyryl | 140–144° C./1.5 mm. |
| 3-isopropylphenyl | CH₃ | Phenoxyacetyl | 90–91.5° C. |
| 2-cyclohexylphenyl | CH₃ | Acetyl | 79–80° C. |
| 4-chloro-3,5-dimethylphenyl | CH₃ | ----do---- | 168–170° C./3 mm. |
| 3,5-diisopropylphenyl | CH₃ | Propionyl | 170–180° C./3 mm. |
| 4-dimethylamine-3,5-dimethylphenyl | CH₃ | Butyryl | 168–176° C./2 mm. |
| 4-dimethylamino-3,5-dimethylphenyl | CH₃ | Acetyl | 79–80° C. |
| 2-chloro-4,6-dimethylphenyl | CH₃ | ----do---- | 102° C. |
| 2,4-dichloro-3-methylphenyl | CH₃ | Acryloyl | 100.5–102.5 C. |
| 1-naphthyl | CH₃ | Isobutyryl | 94–95° C. |
| Do | CH₃ | Phenoxyacetyl | 114–115° C. |
| Do | CH₃ | Isobutyryl | 146–150° C./1.5 mm. |
| 2-isopropoxyphenyl | CH₃ | Phenoxyacetyl | 218–220° C./1.5 mm. |
| Do | CH₃ | Acetyl | 80–82° C. |
| 4-methyl-2-methylthiophenyl | CH₃ | ----do---- | 58–59° C. |
| 3-methyl-4-methylthiophenyl | CH₃ | ----do---- | 165° C./0.5 mm. |
| 2-isopropyl-4-methylthiophenyl | CH₃ | ----do---- | 166° C./1 mm. |
| 2-isopropyl-5-methyl-4-methylthiophenyl | CH₃ | ----do---- | 152–154° C./0.7 mm. |
| 2-ethylthiophenyl | CH₃ | | |

Example 2

A mixture of 1-naphthyl N-methylcarbamate (15 gm.) and propionic anhydride (75 ml.) was heated under reflux for 3 hours and the excess of anhydride then removed by distillation. The residue was distilled under reduced pressure and the fraction B.P. 176° C./1.7 mm. collected. This crystallised on standing; recrystallisation from light petroleum (B.P. 60–80° C.) gave 1-naphthyl N-methyl-N-propionylcarbamate, M.P. 58.5–61° C. (Found: C, 70.4; H, 5.9. $C_{15}H_{15}NO_3$ requires C, 70.0; H, 5.8%.)

In a similar manner the following compounds were prepared:

2-biphenylyl N-acetyl-N-methylcarbamate, M.P. 64–66° C. (Found: C, 71.7; H, 5.6. $C_{16}H_{15}NO_3$ requires C, 71.4; H, 5.6%.)

2-biphenylyl N-methyl-N-propionylcarbamate, M.P. 68–69.5° C. (Found: C, 72.5; H, 6.1. $C_{17}H_{17}NO_3$ requires C, 72.1; H, 6.0%.)

Example 3

To 1-naphthyl N-methylcarbamate (20 gm.) there was added acetic anhydride (100 ml.) and concentrated sulphuric acid (2 drops). The mixture was boiled under reflux for 25 minutes and then anhydrous sodium acetate (ca. 1 gm.) was added to neutralise the sulphuric acid. Excess acetic anhydride was removed by distillation at 20 mm.; the cooled residue was triturated with water (50 ml.), the solid collected, washed with water and finally dried in vacuo. Recrystallisation from light petroleum (B.P. 60–80° C.) gave 1-naphthyl N-acetyl-N-methylcarbamate, M.P. 102–4° C. (Found: N, 6.1. $C_{14}H_{13}NO_3$ requires N, 5.8%.)

In a similar manner, the following compounds were prepared: 1-naphthyl N-butyryl-N-methylcarbamate, M.P. 60–62° C. (Found: N, 5.3. $C_{16}H_{17}NO_3$ requires N, 5.2%.)

2,3,5-trimethylphenyl N - acetyl - N - methylcarbamate, M.P. 52–54° C. (Found: C, 66.6; H, 7.4. $C_{13}H_{17}NO_3$ requires C, 66.4; H, 7.2%.)

2-isopropylphenyl N-acetyl-N-methylcarbamate, B.P. 120–130° C./2 mm. (Found: N, 6.3. $C_{13}H_{17}NO_3$ requires N, 6.0%.)

1-naphthyl N-acetyl-N-ethylcarbamate, M.P. 68–69.5° C. (Found: N, 5.7. $C_{15}H_{15}NO_3$ requires N, 5.4%.)

Example 4

An insecticidal dust was prepared by grinding a mixture of 1-naphthyl N-acetyl-N-methylcarbamate (10 parts) and kaolin (90 parts).

Example 5

A dispersible powder was prepared by grinding a mixture of 1-naphthyl N-acetyl-N-methylcarbamate (20 parts), Belloid T.D.—a proprietary dispersing agent (8 parts) and kaolin (72 parts).

Example 6

A composition suitable for dilution with water to produce a stable emulsion was prepared by mixing the following ingredients: 1-naphthyl N-acetyl-N-methylcarbamate (5 parts), Arylan C.A.—a proprietary emulsifying agent (2 parts), Ethylan B.V.—a proprietary emulsifying agent (2 parts), and toluene (91 parts).

Example 7

A dispersible powder was prepared by grinding a mixture of 1-naphthyl - N - acetyl - N - methylcarbamate (25 parts), Belloid T.D. (8 parts), Nansa S40—a proprietary wetting agent (2.5 parts) and kaolin (64.5 parts).

Example 8

A mixture of 1-naphthyl N-methylcarbamate (20.1 g.), dry xylene (80 ml.), and acetyl chloride (8 ml.) was boiled under reflux for 40 hours. The solid which crystallised from the cooled mixture was collected, washed with light petroleum (B.P. 40–60°), and dried in vacuo to give 1-naphthyl N-acetyl-N-methylcarbamate, M.P. 102–104° C.

Example 9

N-methylacetamide (16.1 g.) was added dropwise to a solution of alpha-naphthyl chloroformate (prepared in situ from 28.8 g. alpha-naphthol) in toluene, the temperature being maintained at 20–25° C. N,N-dimethylaniline (28 ml.) was then added dropwise at 20–25° C. and the mixture was stirred at room temperature for 20 hours. The reaction mixture was washed successively with dilute hydrochloric acid, sodium hydroxide solution and water, dried over anhydrous magnesium sulphate and distilled to remove the toluene. Crystallisation of the residue from light petroleum (B.P. 60–80° C.) gave 1-naphthyl N-acetyl-N-methylcarbamate, identical with that described in Example 3.

Example 10

A mixture of 1-naphthyl N-acetylcarbamate (4.6 gm.), dry acetone (60 ml.) anhydrous potassium carbonate (2.8 gm.) and dimethyl sulphate (2.5 gm.) was refluxed and stirred for 8 hours. After filtration and removal of the bulk of the acetone by distillation, the residue was diluted with water. The precipitate so obtained was recrystallised from alcohol to give 1-naphthyl N-acetyl-N-methylcarbamate, identical with that described in Examples 3 and 9.

Example 11

A mixture of N-methylacetamide (7.3 gm., 8 ml.) and toluene (150 ml.) was distilled to remove water (final B.P. 111° C.). To this a 50% dispersion in oil of sodium hydride (5.4 gm.) was added and the mixture stirred at room temperature. When evolution of hydrogen had ceased, the mixture was heated to 100° C. Finally a further quantity of sodium hydride dispersion (7.5 gm.) was added. The precipitate was collected, washed with toluene, dried over phosphorus pentoxide, and added to a 12% w./v. solution of phosgene in toluene (200 ml.). Phosgene was then passed into the reaction mixture for a further 30 minutes at 30° C. The mixture was filtered and the filtrate evaporated to give crude N-acetyl-N-methylcarbamoyl chloride.

To this, there was added sodium alpha-naphtholate in the form of the reaction mixture of alpha-naphthol (3.5 gm.), 50% sodium hydride (1.5 gm.) and toluene (20 ml.). After the exothermic reaction had finished, the mixture was filtered, and the oily residue extracted with light petroleum (B.P. 60–80° C.). This was evaporated and the residue recrystallised to give 1-naphthyl N-acetyl-N-methylcarbamate, identical with that described in Examples 3, 9 and 10.

Example 12

A composition suitable for dilution with water to produce an emulsion was prepared containing the following ingredients.

Percent w./v.
3-isopropylphenyl N-acetyl-N- methylcarbamate ____ 50
Agrilan A (a proprietary blend of anionic and non-
 ionic emulsifying agents) _____ 5
Xlyene to 100% vol.

Example 13

Dispersible powders were prepared by grinding the following mixtures (parts by weight):

(a)

| | Percent |
|---|---|
| 1-naphthyl N-acetyl-N-methyl-carbamate | 50 |
| Ethylan C.P. (a proprietary wetting agent) | 5 |
| Aerosil (a proprietary silicic acid) | 2.5 |
| Sulphite lye, calcium based | 10 |
| Kaolin, to | 100 |

(b)

| | |
|---|---|
| 1-naphthyl N-acetyl-N-methyl-carbamate | 50 |
| Ethylan C.P. | 5 |
| Aerosil | 2.5 |
| Sulphite lye, calcium based | 10 |
| Polyvinyl alcohol | 1 |
| Kaolin, to | 100 |

Example 14

A mixture of 2-isopropoxyphenyl N-methylcarbamate (41.8 gm.), dry xylene (80 ml.), dimethylaniline (26.5 ml.) and methoxyacetyl chloride (20.5 ml.) was boiled under reflux for 24 hours. After cooling the reaction mixture was washed with dilute hydrochloric acid, dilute sodium hydroxide and finally water and the dried organic layer was distilled under reduced pressure to give 2-isopropoxyphenyl N-methoxyacetyl - N - methylcarbamate, B.P. 154–174° C./2–4 mm.

From the appropriate carbamate and acid chloride, the folowing were also prepared:

2-isopropylphenyl NR'-CO-N-methylcarbamates

R'CO=methoxyacetyl B.P. 154–8/2 mm.

21

=methylthioacetyl B.P. 165–174/2.5 mm.
=p-chlorophenoxyacetyl M.P. 102–104.
=γ-methoxycarbonylbutyryl B.P. 180–200/0.4 mm.
=chloroacetyl M.P. 37–39.
=beta-(p-nitrophenyl)propionyl, an oil.

2-isopropoxyphenyl N-R′CO-N-methylcarbamates

R′CO=methylthioacetyl B.P. 178–182/2 mm.
=ethoxyacetyl B.P. 133/0.08 mm.
=p-chlorophenoxyacetyl M.P. 62–64.
=β-ethoxyethoxyacetyl B.P. 160/0.08 mm.
=γ-methoxycarbonylbutyryl B.P. 204–208/2.5 mm.
=β-methoxycarbonylpropionyl B.P. 172–180/0.7–0.8 mm.
=chloroacetyl B.P. 176–8/4 mm.
=o-tolyloxyacetyl M.P. 71–73° C.
=benzyloxyacetyl B.P. 218/0.5 mm.
=decyloxyacetyl B.P. 238–246/3.5 mm.

2-sec.butylphenyl N-R′CO-N-methylcarbamates

R′CO=methoxyacetyl B.P. 151–156/1 mm.
=methylthioacetyl B.P. 129/0.2 mm.
=γ-methoxycarbonylbutyryl B.P. 192–196/2 mm.
=chloroacetyl B.P. 157–158/1.6 mm.
=p-chlorophenoxyacetyl M.P. 92–93.

3-isopropylphenyl N-R′CO-N-methylcarbamates

R′CO=methoxyacetyl B.P. 159–161/1.5 mm.
=methylthioacetyl B.P. 165/1.0 mm.
=chloroacetyl B.P. 148–152/1 mm.

3-sec.butylphenyl N-R′CO-N-methylcarbamates

R′CO=methoxyacetyl B.P. 138–142/0.3 mm.
=methylthioacetyl B.P. 184–190/2.5 mm.
=chloroacetyl B.P. 156–159/0.6 mm.
=phenoxyacetyl M.P. 64–65.

3-tert-butylphenyl N-R′CO-N-methylcarbamates

R′CO=methoxyacetyl B.P. 150–160/0.7–1.0 mm.
=methylthioacetyl B.P. 172/3.5 mm.
=chloroacetyl B.P. 162–166/1.5 mm.
=p-chlorophenoxyacetyl M.P. 123–125.
=ethoxalyl M.P. 71–73.

2-allylphenyl N-R′CO-N-methylcarbamates

R′CO=chloroacetyl B.P. 153–156/1.2 mm.

Example 15

2-isopropylphenyl N-methyl-N-β-(p-nitrophenyl)propionyl carbamate (12 gm.) was shaken with 10% palladium charcoal (0.5 gm.) and methanol (100 ml.) and hydrogen under atmospheric pressure until absorption ceased. The solution was filtered and evaporated, and the residue dissolved an ice-cold 0.5 N hydrochloric acid (500 ml.). The resulting solution was washed with ether and the aqueous layer basified to pH 8. The precipitated oil was taken up in the ether and after drying was evaporated to give 2-isopropylphenyl N-methyl-N-β-(p-aminophenyl) propionyl carbamate as a viscous yellow oil.

Example 16 o-Isopropoxyphenyl N-methyl-N-methylthioacetyl-carbamate (2.97 gm.) in ether (40 ml.) was treated by portions with 0.55 M monoperphthalic acid in ether (40 ml.) at 5–10° C. After 24 hours, the ether was decanted off and evaporated, and the residue taken up in carbon tetrachloride. After filtration the solution was evaporated in vacuo to give o-isopropoxyphenyl N-methyl-sulphonylacetylcarbamate.

Example 17 o-Isopropoxyphenyl N-methyl-N-methylthioacetyl-carbamate (3.03 gm.) in ether (30 ml.) was treated with 0.56 M monoperphthalic acid (18.5 ml.) at 10–15° C.

22 and was allowed to stand at 15° C. for 20 minutes. After washing with aqueous sodium bicarbonate and drying, evaporation gave o-isopropoxyphenyl N-methyl-N-methylsulphinylacetylcarbamate.

Example 18

A solution of 2-isopropoxyphenyl N-chloroacetyl-N-methyl-carbamate (8.55 gm.) in absolute alcohol (25 ml.) was added with stirring to a refluxed suspension of sodium benzenesulphinate dihydrat (6 gm.) in alcohol (50 ml.). After refluxing overnight, the cooled mixture was poured into water and extracted with ether. Concentration gave 2-isopropoxyphenyl N-methyl-N-benzenesulphonylacetylcarbamate, M.P. 104–105° C.

In a similar manner, 2-isopropoxy N-methyl-N-(p-toluenesulphonylacetyl) carbamate, M.P. 85–88° C., was prepared.

Example 19

2-isopropylphenyl N-chloroacetyl-N-methylcarbamate (7.1 gm.) was added portionwise to a refluxing mixture of alcohol (30 ml.) and potassium thiocyanate (5.1 gm.). After 24 hours, the cooled mixture was poured into water, extracted with ether, and distilled to give 2-isopropylphenyl N-methyl-N-thiocyanatoacetylcarbamate, B.P. 160–166/0.1 mm.

In a similar manner, there were prepared 2-isopropoxyphenyl N-methyl-N-thiocyanatoacetylcarbamate, $n_D^{16}$ 1.5325, and 2-sec.butylphenyl N-methyl-N-thiocyanatoacetylcarbamate, B.P. 182–188° C./1–1.5 mm.

Example 20

2-isopropylphenyl N-chloroacetyl-N-methylcarbamate (6 gm.), triethylamine (3.3 gm.) and methylene chloride (6 ml.) were mixed and allowed to stand at room temperature for 24 hours. Dry ether (70 ml.) was then added, and after 10 minutes, the liquid was decanted from the brown oil. Drying of the oil in a vacuum desiccator gave 2-isopropyl N-(diethylaminoacetyl)-N-methylcarbamate ethochloride (found: Cl (ionisable), 9.3. $C_{19}H_{31}ClN_2O_3$ requires Cl, 9.6%).

In a similar manner there were prepared 2-isopropoxyphenyl N-(diethylaminoacetyl)-N-methylcarbamate, 2-sec.butylphenyl N-(diethylaminoacetyl)-N-methylcarbamate, 3-isopropylphenyl N-(diethylaminoacetyl)-N-methylcarbamate, 3-tert.butylphenyl N-(diethylaminoacetyl)-N-methylcarbamate, 3-sec.butylphenyl N-(diethylaminoacetyl)-N-methylcarbamate, and 2-allylphenyl N-(diethylaminoacetyl)-N-methylcarbamate ethochlorides.

We claim:
1. A pesticidal composition which comprises a conventional pesticide adjuvant and a pesticidally effective amount of a compound of the formula

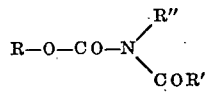

in which R″ is lower alkyl; R is a radical selected from the group consisting of naphthyl, phenyl, and phenyl containing at least one substituent selected from the group consisting of lower alkyl, lower alkoxy, lower cycloalkyloxy, lower cycloalkyl, lower cycloalkenyl, lower alkenyl, lower alkylthio, phenyl-lower alkyl, phenyl-lower alkoxy, phenyl-lower alkylthio, di-(lower alkyl)amino, nitro, hydroxy, phenyl, halogen and the radical —OCON(R″)COR′; and R′ is a radical selected from the group consisting of alkyl with less than 16 carbon atoms, alkenyl with less than 16 carbon atoms, halogenated alkyl with less than 16 carbon atoms, phenyl, lower alkyl-phenyl, halophenyl, hydroxyphenyl, nitrophenyl, lower alkoxy-lower alkyl, lower alkoxy-lower alkoxy-lower alkyl, phenyl-lower alkoxy-lower alkyl, lower alkylthio-lower alkyl, lower alkylsulphinyl-lower alkyl, lower alkylsulphonyl-lower alkyl, nitrophenyl-lower alkyl, aminophenyl-lower alkyl, phenoxy-lower alkyl, lower alkylphenoxy-lower alkyl, lower alkoxyphenoxy-lower alkyl, halophenoxy-lower alkyl, phenylthio-lower alkyl, lower alkylphenylthio-lower alkyl, lower alkoxyphenylthio-lower alkyl, halophenylthio-lower alkyl, thiocyanato-lower alkyl, phenylsulphinyl-lower alkyl, lower alkyl phenysulphinyl-lower alkyl, lower alkoxy phenylsulphinyl-lower alkyl, halophenylsulphinyl-lower alkyl, phenylsulphonyl-lower alkyl, lower alkyl phenylsulphonyl-lower alkyl, lower alkoxy phenylsulphonyl-lower alkyl, halophenylsulphonyl-lower alkyl, carboxyl (in a form selected from the free acid salts thereof, and lower alkyl esters thereof), carboxy-lower alkyl (in a form selected from the free acid, salts thereof, and lower alkyl esters thereof, sulphoalkyl (in a form selected from the free acid, salts thereof, lower alkyl esters thereof), benzyl esters thereof and phenyl esters thereof and the radical $\geqslant N^+$ $(X^-)$-alk- in which the individual valency bonds of the nitrogen atom taken separately are linked with radicals selected from the group consisting of lower alkyl, lower cycloalkyl, phenyl and phenyl-lower alkyl, alk is lower alkylene, and X is a quaternising anion.

2. A pesticidal compostion which comprises a conventional pesticide adjuvant and a pesticidally effective amount of a compound of the formula

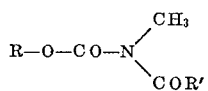

in which R is a radical selected from the group consisting of 2-isopropylphenyl, 2-isopropoxyphenyl, 2-sec.butylphenyl, 3-isopropylphenyl, 3-sec.butylphenyl, 3-tert.butylphenyl, 4-dimethylamina-3,5-dimethylphenyl, 2-chloro-4,5-dimethylphenyl, 4-methylthio-3,5-dimethylphenyl connaphthyl; and R' is a radical selected from the group consisting of alkyl with less than 16 carbon atoms, alkenyl with less than 16 carbon atoms, halogenated alkyl with less than 16 carbon atoms, halogenated alkenyl with less than 16 carbon atoms, lower alkoxy-lower alkyl, lower alkoxy-lower alkoxy-lower alkyl, lower alkylthio-lower alkyl, phenoxy-lower alkyl, halophenoxy-lower alkyl, lower alkylphenoxy-lower alkyl, thiocyanato-lower alkyl and lower alkoxycarbonyl.

3. A composition as claimed in claim 2 in which R' is methyl.

4. A composition as claimed in claim 2 in which R' is chloromethyl.

5. A composition as claimed in claim 2 in which R' is lower alkoxycarbonyl.

6. A composition as claimed in claim 2 in which R is 3-isopropylphenyl and R' is chloromethyl.

7. A composition as claimed in claim 2 in which R is 3-tert-butylphenyl and R' is chloromethyl.

8. A composition as claimed in claim 2 in which R is 3-tert-butylphenyl and R' is chloromethyl.

9. A composition as claimed in claim 2 in which R is 4-dimethylamino-3,5-dimethylphenyl and R' is methyl.

10. A process for controlling pests which comprises applying to the pests or their loci a pesticidally effective amount of a compound of the formula

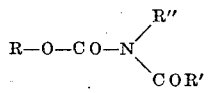

inwhich R'' is lower alkyl; R is a radical selected from the group consisting of naphthyl, phenyl, and phenyl containing at least one substituent selected from the group consisting of lower alkyl, lower alkoxy, lower cycloalkyloxy, lower cycloalkyl, lower cycloalkenyl, lower alkenyl, lower alkylthio, phenyl-lower alkyl, phenyl-lower alkoxy, phenyl-lower alkylthio, di-(lower alkyl)amino, nitro, hydroxy, phenyl, halogen and the radical -OCON(R'')COR'; and R' is a radical selected from the group consisting of alkyl with less than 16 carbon atoms, alkenyl with less than 16 carbon atoms, halogenated alkyl with less than 16 carbon atoms, halogenated alkenyl with less than 16 carbon atoms, phenyl, lower alkyl-phenyl, halophenyl, hydroxyphenyl, nitrophenyl, lower alkoxy-lower alkyl, lower alkoxy-lower alkoxy-lower alkyl, phenyl-lower alkoxy-lower alkyl, lower alkylthio-lower alkyl, lower alkylsulphinyl-lower alkyl, lower alkly-sulphonyl-lower alkyl, nitrophenyl-lower alkyl, aminophenyl-lower alkyl, phenoxy-lower alkyl, lower alkylphenoxy-lower alkyl, lower alkoxyphenoxy-lower alkyl, halophenoxy-lower alkyl, phenylthio-lower alkyl, lower alkylphenylthio-lower alkyl, lower alkoxyphenylthio-lower alkyl, halophenylthio-lower alkyl, thiocyanato-lower alkyl, phenylsulphinyl-lower alkyl, lower alkyl phenylsulphinyl-lower alkyl, lower alkoxy phenylsulphinyl-lower akyl, halophenylsulfinyl-lower alkyl, phenylsulphonyl-lower alkyl, lower alkyl phenylsulphony-lower alkyl, lower alkoxy phenylsulphony-lower alkyl, halophenylsulphony-lower alkyl, carboxyl (in a form selected from the free acid, salts thereof, and lower alkyl esters thereof), carboxy-lower alkyl (in a form selected from the free acid, salts thereof, and lower alkyl esters thereof), sulphoalkyl (in a form selected from the free acid, salts thereof, lower alkyl esters thereof, benzyl esters thereof and phenyl esters thereof) and the radical $\geqslant N^+$ $(X^-)$-alk-in which the individual valency bonds of the nitrogen atom taken separately are linked with radicals selected from the group consisting of lower alkyl, lower cycloalkyl, phenyl and phenyl-lower alkyl, alk is lower alkaline, and X is a quaternising anion.

11. A process for controlling pests which comprises applying to the pests or their loci a pesticidally effective amount of a compound of the formula

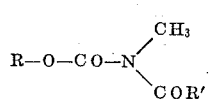

in which R is a radical selected from the group consisting of 2-isopropylphenyl, 2-isopropoxyphenyl, 2-sec.butylphenyl, 3-isopropylphenyl, 3-sec. butylphenyl, 3-tert.butylphenyl, 4-dimethylamino-3,5-dimethylphenyl, 2-chloro-4,5-dimethylphenyl, 4-methylthio-3,5-dimethylphenyl and 1-naphthyl; and R' is a radical selected from the group consisting of alkyl with less than 16 carbon atoms, alkenyl with less than 16 carbon atoms, halogenated alkyl with less than 16 carbon atoms, halogenated alkenyl with less than 16 carbon atoms, lower alkoxy-lower alkyl, lower alkoxy-lower alkoxy-lower alkyl, lower alkylthio-lower alkyl, phenoxy-lower alkyl, halophenoxy-lower alkyl, lower alkylphenoxy-lower alkyl, thiocyanato-lower alkyl and lower alkoxycarbonyl.

12. A process as claimed in claim 11 in which R' is methyl.

13. A process as claimed in claim 11 in which R' is chloromethyl.

14. A process as claimed in claim 11 in which R' is lower alkoxycarbonyl.

15. A process as claimed in claim 11 in which R is 3-isopropylphenyl and R' is chloromethyl.

16. A process as claimed in claim 11 in which R is 3-tert.butylphenyl and R' is chloromethyl.

17. A process as claimed in claim 11 in which R is 3-tert.butylphenyl and R' is methyl.

18. A process as claimed in claim 11 in which R is 4-dimethylamino-3,5-dimethylphenyl and R' is methyl.

19. A process as claimed in claim 11 in which the pesticidal compound is applied at the rate of 0.1–500 lb./ acre to plants or the ground in which plants are to be grown.

References Cited

UNITED STATES PATENTS

| | | | |
|---|---|---|---|
| 2,306,599 | 12/1942 | Engle et al. | 260—479 XR |
| 2,401,080 | 5/1946 | Kilgore et al. | 167—30 XR |
| 2,520,586 | 8/1950 | Weber et al. | 167—30 XR |
| 2,903,478 | 9/1959 | Lambrech | 260—479 |
| 3,037,993 | 6/1962 | Shulgin | 260—479 XR |
| 3,318,947 | 5/1967 | Speziale et al. | 260—479 XR |

FOREIGN PATENTS 1,381,253  11/1964  France.

OTHER REFERENCES

Metcalf Pest Control 30(6):20–28, June 1962.
Fraser et al. J. Sci. Fd. Agric. 16:615–618 October 1965.
Reay et al. J. Sci. Fd. Agric. 17:17–19, January 1966.

LEWIS GOTTS, *Primary Examiner.*

S. K. ROSE, *Assistant Examiner.*